(12) United States Patent
Walker et al.

(10) Patent No.: US 8,792,899 B2
(45) Date of Patent: Jul. 29, 2014

(54) REGIONALIZED DELIVERY OF HYBRID MOBILE BROADCAST SERVICES OR CHANNELS IN A MOBILE BROADCAST NETWORK

(75) Inventors: Gordon Kent Walker, Poway, CA (US); An Mei Chen, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 902 days.

(21) Appl. No.: 12/267,523

(22) Filed: Nov. 7, 2008

(65) Prior Publication Data
US 2010/0120417 A1    May 13, 2010

(51) Int. Cl.
*H04W 72/00* (2009.01)
(52) U.S. Cl.
USPC ........... 455/451; 455/453; 455/454; 370/238; 725/39
(58) Field of Classification Search
USPC .................. 370/238; 455/450, 451, 453, 454; 725/39
See application file for complete search history.

(56) References Cited

U.S. PATENT DOCUMENTS

| | | | | |
|---|---|---|---|---|
| 6,519,262 | B1 * | 2/2003 | Stephens et al. | 370/442 |
| 7,685,615 | B2 | 3/2010 | Bertin | |
| 7,843,969 | B2 * | 11/2010 | Bargauan | 370/486 |
| 2001/0025377 | A1 * | 9/2001 | Hinderks | 725/109 |
| 2005/0251843 | A1 | 11/2005 | Walker | |
| 2006/0251115 | A1 * | 11/2006 | Haque et al. | 370/466 |
| 2006/0256708 | A1 * | 11/2006 | Wang et al. | 370/206 |
| 2007/0036065 | A1 | 2/2007 | Wang | |
| 2007/0118850 | A1 | 5/2007 | Bertin | |
| 2007/0263580 | A1 * | 11/2007 | Grob-Lipski et al. | 370/338 |
| 2009/0019307 | A1 * | 1/2009 | Kwon | 714/16 |
| 2009/0170607 | A1 * | 7/2009 | Chiao et al. | 463/42 |
| 2009/0248886 | A1 * | 10/2009 | Tan et al. | 709/231 |

FOREIGN PATENT DOCUMENTS

WO    2007029090    3/2007

OTHER PUBLICATIONS

Murali R Chari et al: FLO Physical Layer: An Overview, IEEE Transactions on Broadcasting, IEEE Service Center, Piscataway, N.J, US, vol. 53, No. 1, Mar. 1, 2007, pp. 145-160, XP011172013, ISSN: 0018-9316, p. 148, col. 2, line 10-line 15.
International Search Report, PCT/US2009/063612, International Searching Authority, European Patent Office, Apr. 8, 2010.
Written Opinion, PCT/US2009/063612, International Searching Authority, European Patent Office, Apr. 8, 2010.

* cited by examiner

*Primary Examiner* — Wesley Kim
*Assistant Examiner* — Joseph Dean, Jr.
(74) *Attorney, Agent, or Firm* — The Marbury Law Group, PLLC

(57) ABSTRACT

Methods, apparatus and computer program products are defined for a hybrid mobile broadcast service. By forming hybrid services from both wide area components and local area components, hybrid services are able to be regionalized so as to meet the needs of the users in given a locale or region. In one example, a wide area video component may be combined with a local area alternate language to provide an alternate language service to a specified geographic region within the mobile broadcast network. In additional aspects, multiple local area infrastructures can be combined to form a regionalized infrastructure for the purpose of delivering the hybrid service across a designated region.

51 Claims, 10 Drawing Sheets

REGIONALIZED DELIVERY OF HYBRID MOBILE BROADCAST SERVICES OR CHANNELS IN A MOBILE BROADCAST NETWORK

BACKGROUND

In recent years, the wireless industry has experienced explosive growth in device capability especially in relation to mobile cellular phones and other handheld wireless devices. Ever increasing computing power, memory and high-end graphic functionalities have accelerated the development of new wireless services. Among such services is the simultaneous delivery of large volumes of multimedia content to a vast numbers of wireless devices.

The large-scale deployment of mass media services/media objects over wireless communication networks may utilize broadcast/multicast network capabilities. Multimedia Broadcast and Multicast Service (MBMS) and Broadcast and Multicast Service (BCMCS), as proposed by telecommunications specifications-setting projects, such as the $3^{rd}$ Generation Partnership Project (3GPP) and $3^{rd}$ Generation Partnership Project 2 (3GPP2), as well as, MediaFLO™ technology as developed and available from Qualcomm Incorporated of San Diego, Calif., are targeted towards enabling multimedia content transfer to handheld communication devices over the wireless channel. The MediaFLO™ broadcast network provides services that allow transfer of media objects, such as digital movie clips, sports broadcasts, video clips and music files. Additionally, other broadcast technologies have been implemented globally, for example, Digital Video Broadcasting-Handheld (DVB-H) has gained acceptance in Europe, Integrated Services Digital Broadcast-Terrestrial (I-SDB-T) has been standardized in Japan, and Digital Multimedia Broadcasting (DMB) has been adopted in China.

Forward Link Only (FLO), the basis for MediaFLO™ is a digital wireless technology that has been developed by an industry-led group of wireless providers. The FLO technology was designed, in one aspect, for a mobile multimedia environment and exhibits performance characteristics suited for use on cellular handsets. It uses advances in coding and interleaving to achieve high-quality reception, both for real-time content streaming and other data services. FLO technology can provide robust mobile performance and high capacity without compromising power consumption. The technology also reduces the network cost of delivering multimedia content by dramatically decreasing the number of transmitters needed to be deployed. In addition, FLO technology-based multimedia transport complements wireless operators' cellular network data and voice services, delivering content to the same cellular handsets used on 3G networks.

The FLO wireless system has been designed to broadcast real time audio and video signals, in addition to, but separate from, non-real time services to mobile users. The respective FLO transmission is carried out using tall and high power transmitters to ensure wide coverage in a given geographical area. Further, it is common to deploy 3-4 transmitters in most markets to ensure that the FLO signal reaches a significant portion of the population in a given market. During the acquisition process of a FLO data packet, several determinations and computations are made to determine such aspects as frequency offsets for the respective wireless receiver. Given the nature of FLO broadcasts that support multimedia data acquisitions, efficient processing of such data and associated overhead information is paramount. For instance, when determining frequency offsets or other parameters, complex processing and determinations are used where determinations of phase and associated angles are employed to facilitate the FLO transmission and reception of data.

Mobile broadcast networks have been designed specifically to provide efficient and economical distribution of multimedia content to wireless devices. Such networks provide the user the ability to "surf" channels of multimedia content on the same handset they traditionally use for cellular voice and data services.

In mobile broadcast networks, such as a MediaFLO™ network and the like, a programming line-up may include real-time streaming video channels capable of delivering live content and non-real-time channels capable of delivering pre-recorded content. Additionally, the programming line-up may be portioned into wide-area content (e.g., national content) and local-area content (e.g. local-market specific content). In this regard, a certain number of real-time streaming video channels may be allocated to wide-area content and a certain number of real-time streaming video channels may be allocated to local-area content. Similarly, a certain number of non-real-time streaming video channels may be allocated to wide-area content and a certain number of non-real-time streaming video channels may be allocated to local-area content. In addition to wide area content and local area content, a large number of Internet Protocol (IP) data channels can be included in the programming line-up. Such channels may include, but are not limited to, traffic information, weather information, news information, financial information and the like.

The local-area content is broadcasted via a Local Operations Infrastructure (LOI), which is a collection of equipment, including a plurality of transmitters, and software deployed in the local area in support of a specific market within the network. A "market" is defined as a geographic area comprised of continuous development, such as a major metropolitan area. Thus, each individual market is supported by a LOI and its associated local multiplex. A grouping or collection of LOIs may form a Wide area Operation Infrastructure (WOI), which is the collection of equipment and software deployed in the wide-area, such as nation-wide, time zone-wide or the like in support of the collection of LOIs. In this regard, the WOI is the distribution point for wide area content, which is communicated to the LOIs and broadcasted via the transmitters dispersed throughout the LOIs.

In many countries, particularly European countries and, to a lesser degree, countries such as the United States and Canada, regional languages prevail. For example, in Italy regional varieties of Italian are prominent throughout the country. In addition, in northern Italy Italian and German are prevalent, while in southern Italy Italian and Sicilian are commonly used. In Canada, French is the prominent language in the province of Quebec while English prevails throughout most other provinces. In the United States, Spanish is prevalent across the southwestern region and southern Florida, while French is common in Louisiana and along the northeastern Canadian border.

If a mobile broadcast system, such as MediaFLO™ DVB-H or the like, chooses to provide wide area content in alternate languages, the content is broadcast across the entire wide area. For example, if the mobile broadcast system chooses to broadcast a national (i.e., wide area) sporting event in the alternate languages of French or Spanish a dedicated wide area physical data channel must be assigned to accommodate each of the chosen alternate languages. Thus, if the mobile broadcast system desires to broadcast the national sporting event in English, French and Spanish, three wide area physical data channels must be allocated to accommodate the three separate audio feeds. The need to allocate separate wide area physical data channels is a result of current broadcast system constraints that only allow for a service classification to include a local area channel or a wide area channel, but not both. In many instances if alternate languages are provided across the entire wide-area, the penetration of such alternate language services is over-broad because the area of desired alternate language does not correspond to the entire wide area, such as a country, time zone or collection of time zones. Additionally, if alternate language services are provided across the entire wide-area, resource allocation is constrained. In a typical mobile broadcast system only a limited number of real-time channels may be allocated to the wide area content. As such, if the system has to allocate additional real-time, wide area channels to accommodate alternate language services, the capacity of the network is compromised because the additional allocated wide area channels could be utilized for other services/programs if they are not needed to support the alternate language service.

Therefore, a need exists to efficiently provide for alternate services in a mobile broadcast network. The desired methods, systems, apparatus and the like should be able to provide alternate services while minimizing the allocation of resources within the mobile broadcast network. As such, the desired methods, systems, apparatus and the like, should be capable of limiting the broadcast of alternate services to only those geographic areas to which the alternate service is relevant.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Present methods, apparatus and computer program products are defined for providing hybrid services in a mobile broadcast network, such as but not limited to a MediaFLO™ network or the like. The hybrid mobile broadcast service includes a combination of wide area components and local area components, which serve to localize or regionalize a network service or network channel. For example, a hybrid mobile broadcast service may include a wide area or national video component in combination with a local area audio component, such as an alternate language audio component that is indigenous to the local area. According to aspects herein disclosed, hybrid mobile broadcast services may be formed by combining data streams from multiple independent data sources such as physical channels, for example, Multicast Logical Channels (MLCs), streaming data sources, such as Uniform Multicast Locators (URLs), or the like. For example, a hybrid mobile broadcast service may comprise a video data stream from a first independent data source and an audio data stream from a second independent data source. In addition to combining video and audio streams, aspects herein described also provide for combining other types of data streams, such graphical data streams or the like.

Additionally, the methods, apparatus and systems herein described provide for grouping of multiple Local area Operations Infrastructures (LOIs) into a regionalized infrastructure for the purpose of broadcasting the hybrid mobile broadcast service across the regionalized infrastructure. The regionalized infrastructure may be formed by configuring the scrambling of the multiple LOIs to function as a Single Frequency Network (SFN). Regionalized infrastructures provide for hybrid mobile broadcast services to be broadcast across the defined region, while other regions are excluded from the broadcast of the hybrid mobile broadcast service. For example, a regionalized infrastructure may support the broadcasting of a real-time service, such as a sporting event or the like, in an alternate language, such as Spanish, French or the like. Since the hybrid mobile broadcast service is only provided to the regionalized infrastructure, other LOIs supported by the Wide area Operations Infrastructure (WOI) that are not included within the regionalized infrastructure will have additional bandwidth (e.g., an additional broadcast channel) available for an additional network service. This additional bandwidth can be allocated for an independent video, audio, multimedia and/or interactive network service.

In one aspect a method for providing regionalized delivery of hybrid services in a mobile broadcast network is defined. The method includes providing for a hybrid mobile broadcast service that includes at least one wide area component and at least one local area component and broadcasting the hybrid mobile broadcast service across a plurality of Local Operations Infrastructures (LOIs). The plurality of LOIs define a regionalized infrastructure.

In one aspect of the method providing for the hybrid mobile broadcast service further includes providing for the hybrid mobile broadcast service that includes a plurality of data streams compiled from more than one independent data source, for example more than one physical channel, streaming source, such as URLs, combinations of channels and streaming sources or the like. Additionally, providing for the hybrid mobile broadcast service further includes providing for the hybrid mobile broadcast service that includes a wide area video component and at least one of a local area audio component and a local area data component. In this regard, the hybrid mobile broadcast service may provide for a national video component combined with a local or regional audio component, such as a local or regional alternate language audio component. Additionally, the hybrid mobile broadcast service may provide for a national video and audio component combined with a local or regional data component, such as a local streaming text, e.g., crawl line, or the like suitable for providing local/regionalized information, such as local/regionalized news information, weather information or the like. In one aspect of the method broadcasting the hybrid mobile broadcast service further comprises configuring scrambling for the plurality of LOIs to provide for the plurality of LOIs to function as a regional Single Frequency Network (SFN).

A further aspect of the method provides for reallocating bandwidth in other LOIs outside of the plurality of LOIs based on bandwidth being conserved as a result of providing a hybrid mobile broadcast service broadcasted across the plurality of LOIs. As such, LOIs within the network but outside the regionalized infrastructure have additional available bandwidth because they do not broadcast the hybrid service, as would be the case if the service was broadcasted across the entire Wide area Operations Infrastructure (WOI).

Additional aspects of the method provide for configuring the mobile broadcast network presentation guide for the plurality of LOIs, such that a consistent guide entry exists for the hybrid mobile broadcast service across all program guides deployed in the regionalized infrastructure. In this regard, the local guide associated with a LOI may list the hybrid broadcast service according to a wide area component and one or more local area component, such as a video wide area component associated with one or more audio local area components, such as alternative languages. Additionally, other aspects of the method provide for the program guide to be configured with a fallback service in the event that the hybrid service becomes unavailable or is otherwise interrupted. The fallback service may provide for a designated fallback service in the program guide. For example, if the hybrid service is an alternate language service, the designated fallback service may be the primary language service. Alternatively, the program guide may be configured to allow for an affiliation fallback service. For example, if the hybrid service is unavailable or otherwise interrupted, the program guide may provide for another service to be provided that is affiliated or otherwise associated with the hybrid service.

Additionally, the method may provide for synchronizing the hybrid mobile broadcast for delivery across the plurality of LOIs. The synchronization may include common source labeling, Global Positioning System (GPS) or other standard time, such as relabeling captured source in FLO or other broadcast system time.

A computer program product defines yet another related aspect. The computer program product includes a computer-readable medium. The medium includes at least one instruction for causing a computer to provide for a hybrid mobile broadcast service that includes a wide area component and a local area component. The medium further includes at least one instruction for causing the computer to broadcast the hybrid mobile broadcast service across a plurality of Local Operations Infrastructures (LOIs).

An apparatus provides for yet another related aspect. The apparatus includes means for providing a hybrid mobile broadcast service that includes a wide area component and a local area component and means for broadcasting the hybrid mobile broadcast service across a plurality of Local Operations Infrastructures (LOIs).

A network apparatus, which may include one or more network devices, such as network servers or the like, provides for a further aspect. The network apparatus includes a mobile broadcast service module that includes a hybrid mobile broadcast service module. The hybrid service module is operable to provide a hybrid service that includes a wide area component and a local area component. The broadcast service module further includes a regionalized service module operable to configure a plurality of Local Operations Infrastructures (LOIs) into a regionalized infrastructure operable to broadcast the hybrid mobile broadcast service.

The hybrid service module may be further operable to provide the hybrid mobile broadcast service that includes a plurality of data streams compiled from more than one independent data source, such as physical channels, streaming sources, such as URLs, a combination of the same or the like. Additionally, the hybrid mobile broadcast service module is further operable to provide the hybrid mobile broadcast service that includes a wide area video component and at least one of a local area component, such as a local area audio component or a local area data component. For example, the hybrid service may include a wide area or national video component and a regional or local audio component, such as an alternate language component. The regionalized service module may be further operable to configure scrambling for the plurality of LOIs to provide for the plurality of LOIs to function as a regional Single Frequency Network (SFN).

The apparatus may further include a bandwidth reallocation module operable to reallocate conserved bandwidth as a result of providing a hybrid mobile broadcast service broadcasted across the plurality LOIs. As such, LOIs within the network but outside the regionalized infrastructure have additional available bandwidth because they do not broadcast the hybrid service, as would be the case if the service was broadcasted across the entire Wide area Operations Infrastructure (WOI).

The apparatus may further include a mobile broadcast network guide generator module operable to generate a mobile broadcast network guide configured to indicate the hybrid mobile broadcast service for the plurality of LOIs. In this regard, the local guide associated with a LOI may list the hybrid broadcast service according to a wide area component and one or more local area component, such as a video wide area component associated with one or more audio local area components, such as alternative languages. Additionally, the apparatus may include a service fallback module operable for defining service fallback if the hybrid service is unavailable or otherwise interrupted. In such aspects, mobile broadcast network guide may define a fallback service or a service affiliation. The apparatus may further include a synchronization module operable to synchronize the hybrid mobile broadcast service for the broadcast across the plurality of LOIs by re-labeling captured source data in mobile broadcast network system time.

A method for receiving a regionalized hybrid service in a mobile broadcast network defines another aspect. The method includes receiving broadcast signals transmitted from a Local Operations Infrastructure (LOI) that is included in a plurality of LOIs forming a regionalized infrastructure. The method additionally includes receiving a hybrid mobile broadcast service from the broadcast signals. The hybrid mobile broadcast service is associated with the regionalized infrastructure and includes at least one wide area component and at least one local area component.

In one aspect of the method receiving the hybrid mobile broadcast service is further defined by receiving the hybrid mobile broadcast service that includes a plurality of data streams compiled from more than one independent data source, for example, physical data channels, streaming sources, such as URLs, a combination of the same or the like. Additionally, receiving the hybrid mobile broadcast service may further include receiving the hybrid mobile broadcast service that includes a wide area video component and at least one local area audio component, such as an alternate language or the like, or a local area data component, such as a crawl line or the like. In another aspect of the method receiving broadcast signals transmitted from a LOI may further include receiving broadcast transmissions scrambling for the plurality of LOIs to provide for the plurality of LOIs to function as a regional Single Frequency Network (SFN).

The method may further include receiving and storing a mobile broadcast network guide that indicates the hybrid mobile broadcast service for the plurality of LOIs. The mobile broadcast network guide may further indicate a fallback service, such as a designated fallback service associated with the hybrid service or an affiliated service associated with the hybrid service.

Additionally alternate aspects of the method may provide for receiving the hybrid service to further include receiving the hybrid mobile broadcast service, wherein the hybrid mobile broadcast service has been synchronized for broadcast across the plurality of LOIs by relabeling captured source, such as 3G or 4G delivered local area components, in mobile broadcast network system time.

A computer program product including a computer-readable medium defines yet another aspect. The medium includes at least one instruction for causing a computer to receive broadcast signals transmitted from a Local Operations Infrastructure (LOI) that is included in a plurality of LOIs forming a regionalized infrastructure. The medium additionally includes at least one instruction for causing the computer to receiving a hybrid mobile broadcast service from the broadcast signals. The hybrid mobile broadcast service is associated with the regionalized infrastructure and includes at least one wide area component and at least one local area component.

A related aspect is defined by an apparatus. The apparatus includes means for receiving broadcast signals transmitted from a Local Operations Infrastructure (LOI) that is included in a plurality of LOIs forming a regionalized infrastructure. The apparatus additionally includes means for receiving a hybrid mobile broadcast service from the broadcast signals. The hybrid mobile broadcast service is associated with the regionalized infrastructure and includes at least one wide area component and at least one local area component.

Yet another aspect is provided for a wireless device that includes a computer platform including at least one processor and a memory in communication with the processor. The wireless device additionally includes a mobile broadcast reception module stored in the memory and in communication with the processor. The mobile broadcast reception module is operable to receive broadcast signals transmitted from a Local Operations Infrastructure (LOI) that is included in a plurality of LOIs forming a regionalized infrastructure and receive a hybrid mobile broadcast service from the broadcast signals. The hybrid mobile broadcast service is associated with the regionalized infrastructure and includes at least one wide area component and at least one local area component.

Thus, methods, apparatus and computer program products are defined for a hybrid mobile broadcast service. By forming hybrid services from both wide area components and local area components, hybrid services are able to be regionalized so as to meet the needs of the users in given locale or region. For example, a wide area video component may be combined with a local area alternate language to provide an alternate language service to a specified geographic region within the mobile broadcast network. Since the hybrid service does not have to be broadcast to the entire wide area network, a capacity savings results, in that, bandwidth that would otherwise be used to broadcast the hybrid service system-wide can be re-allocated to another service. In addition multiple local area infrastructures can be combined to form a regionalized infrastructure for the purpose of delivering the hybrid service across a designated region.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote the elements, and in which.

DETAILED DESCRIPTION

Figure 1:
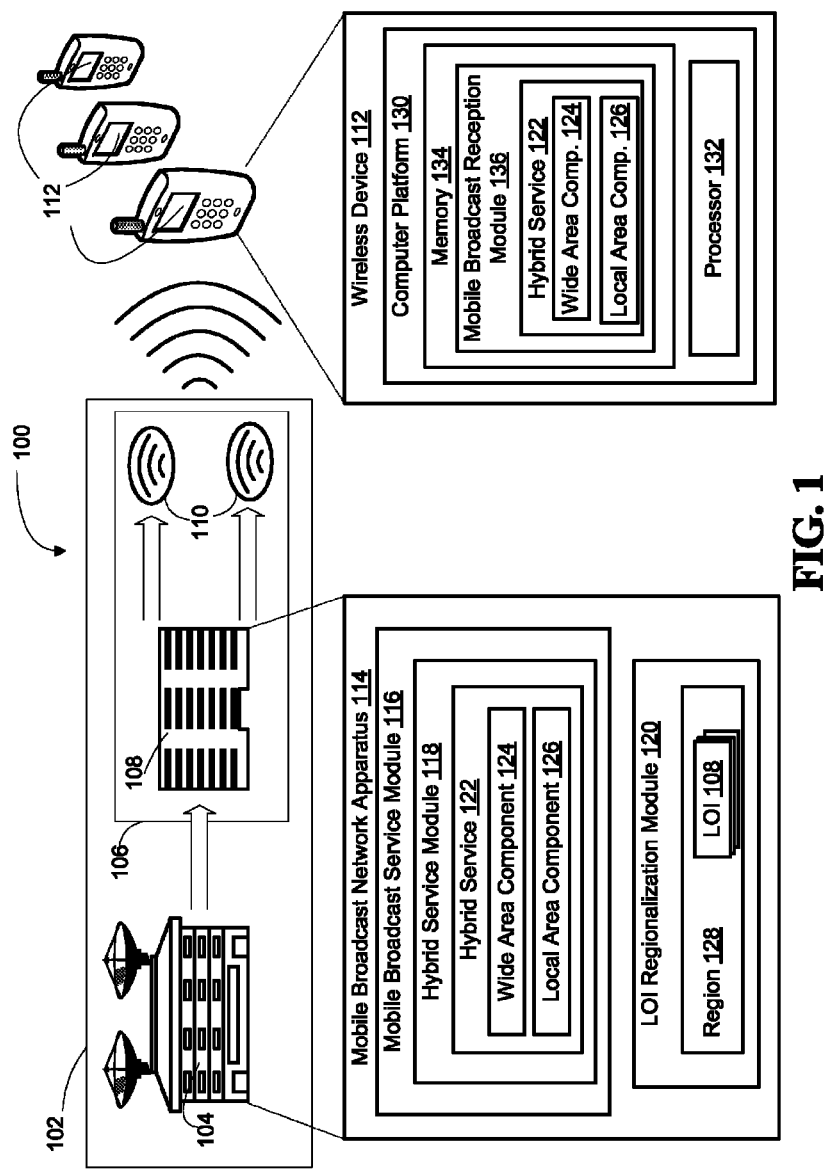
FIG. 1 is a schematic and block diagram of a system for providing hybrid services in a mobile broadcast network, in accordance with described aspects.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Thus, methods, apparatus and computer program products are defined for hybrid services in mobile broadcast network, such as but not limited to a MediaFLO™ network or the like. The hybrid mobile broadcast service includes a combination of wide area components and local area components, which serve to localize or regionalize a network service or network channel. For example, a hybrid mobile broadcast service may include a wide area or national video component in combination with a local area audio component, such as an alternate language audio component that is indigenous to the local area. According to aspects herein disclosed, hybrid mobile broadcast services may be formed by combining data streams from multiple independent data sources. The independent data sources may include but are not limited to physical channels, such as Multicast Logical Channels (MLCs), streaming sources, such as URLs, a combination of the same or the like. For example, a hybrid mobile broadcast service may comprise a video data stream from a first source and an audio data stream from a second source. In addition to combining video and audio streams, aspects herein described also provide for combining other types of data streams, such as graphical data streams or the like.

Additionally, the methods, apparatus and systems herein described provide for grouping of multiple Local area Operations Infrastructures (LOIs) or service into a regionalized infrastructure or service for the purpose of broadcasting the hybrid mobile broadcast service across the regionalized infrastructure. The regionalized infrastructure may be formed by configuring the scrambling of the multiple LOIs to function as a Single Frequency Network (SFN). Regionalized infrastructures provide for hybrid mobile broadcast services to be broadcast across the defined region, while other regions are excluded from the broadcast of the hybrid mobile broadcast service. For example, a regionalized infrastructure may support the broadcasting of a real-time service, such as a sporting event or the like, in an alternate language relative to a primary language of the wide area service. Since the hybrid mobile broadcast service is provided to the regionalized infrastructure, other LOIs supported by the Wide area Operations Infrastructure (WOI) that are not included within the regionalized infrastructure will have additional bandwidth (e.g. an additional broadcast channel) available for an additional network service. This additional bandwidth can be allocated for an independent video, audio, multimedia and/or interactive network service.

Referring to FIG. 1, a mobile broadcast network 100 operable for providing hybrid services is shown, according to one or more aspects. The mobile broadcast network includes a Wide area Operation Infrastructure (WOI) 102 that includes a wide area or National Operations Center (NOC) 104. In countries that are small in geographic area, the WOI 102 may encompass the entire country, while in other countries that occupy a larger geographic area, such as the United States, multiple WOIs 102 may exist, with each WOI 102 encompassing one or more time zones or other area identifiers. The wide area is supported by media supplied to and distributed from NOC 104.

Each WOI 102 additionally includes a collection of Local area Operation Infrastructures (LOIs) 106. For the sake of conciseness, FIG. 1 shows only one of the multiple LOIs included in WOI 102. Each LOI 106 includes the equipment, software, and the like deployed in support of a specific market within the mobile broadcast network. A market is defined as a continuous geographic area and, in most instances corresponds to a metropolitan area, such as New York City, Dallas/Fort Worth, Washington/Baltimore or the like. Each defined market is supported by a LOI and associated local multiplex. LOI 106 includes a Local Operation Center (LOC) 108 and multiple transmitters 110 operable for transmitting services across multiple network channels to one or more wireless devices 112.

In accordance with present aspects, mobile broadcast apparatus 114, which may include one or more devices located within WOI 102, LOI 106 or both WOI 102 and LOI 106, includes a mobile broadcast service module 116 having a hybrid service module 118 and an LOI regionalization module 120. The hybrid service module 118 is operable to provide a hybrid service 122 that includes at least one wide area component 124 and at least one local area component 126. For example, the hybrid service 122 may comprise a wide area video component and a local area audio component. In such an example, the local area audio component may provide for an alternate or secondary language service for a local area or multiple local areas, e.g. a regionalized area. In other examples, the local area component 126 may be a data component operable to provide a streaming text, e.g., a crawl line or the like, in conjunction with the wide area video and audio components. The hybrid service 122 may be formed from multiple sources, such as physical channels, for example, Multicast Logical Channels (MLCs), streaming sources, such as URLs, a combination of physical channels and streaming sources or the like, such that individual data streams from separate sources may be combined to form the hybrid service.

The LOI regionalization module 120 of mobile broadcast service module 116 may be operable to configure a plurality of LOIs 108 into a region 128 that is operable to broadcast the hybrid service 122. In one aspect, the region 128 may be formed by configuring the scrambling of the LOIs to provide for the plurality LOIs to function as a regional Single Frequency Network (SFN).

The system 100 also includes one or more wireless devices 112 that are located in a broadcast area of LOI 106, and thus are operable to receive mobile broadcast services delivered via LOI 106. The wireless devices 112 may include a computer platform 130 having a processor 132 and a memory 134 in communication with the processor 132. The memory 134 may include a mobile broadcast reception module 136 operable to receive mobile broadcast services broadcasted from LOI 106. In this regard, mobile broadcast reception module 136 is operable to receive the hybrid service 122 that includes at least one wide area component 124 and at least one local area component 126. In one aspect, the LOI 106 may be included within a plurality of LOIs forming a region 128, and the hybrid service 122 received by the mobile broadcast reception module 136 may be a hybrid service associated with the region.

Figure 2:
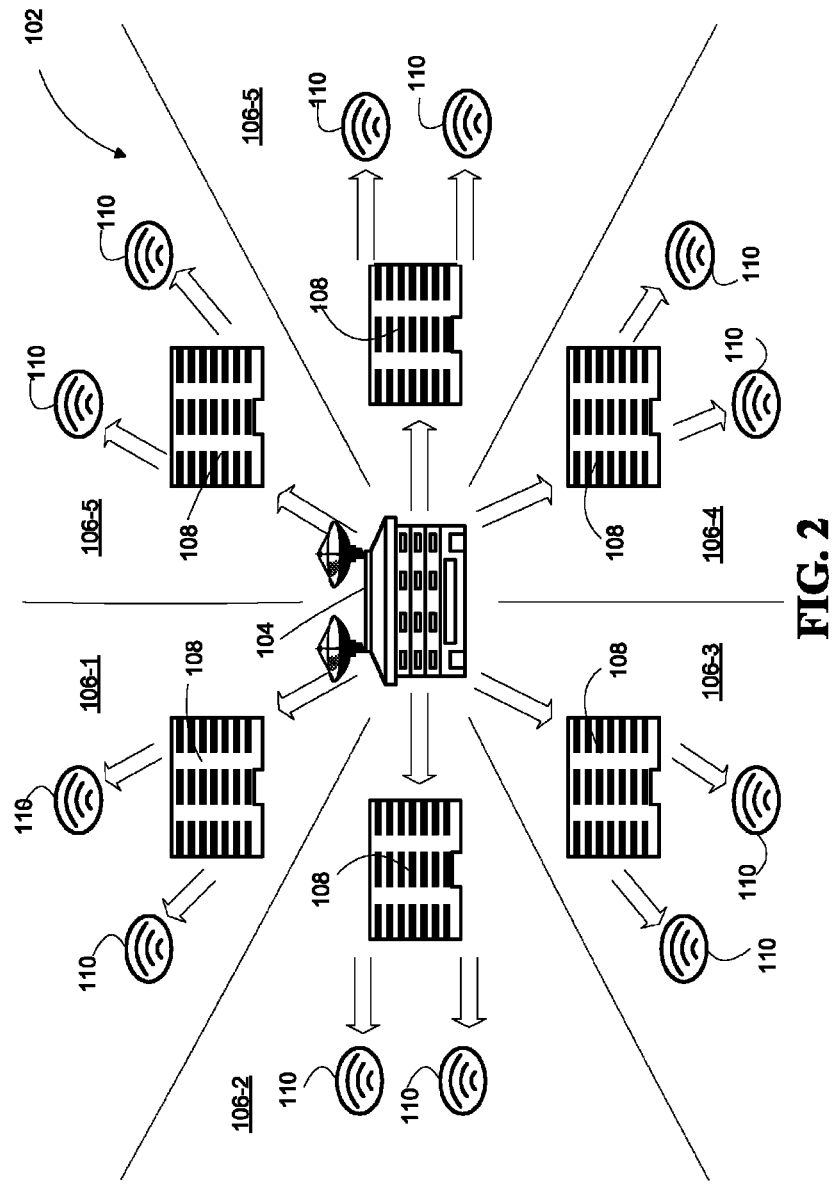
FIG. 2 is a schematic diagram of a mobile broadcast network including a plurality of Local area Operations Infrastructures (LOIs) forming a Wide area Operations Infrastructure, according to described aspects.

Referring to FIG. 2, a mobile broadcast network and, specifically, a Wide area Operations Infrastructure (WOI) 102 is suitable for delivery of hybrid services, according to aspects herein described. The WOI 102 includes a National Operations Center (NOC) 104 operable for distributing wide area services to the collection of Local Area Operations Infrastructures (LOIs) 106-1-106-5. As shown in FIG. 2 each LOI 106-1 to 106-5 occupies a specific geographic area and, as such, wireless devices (not shown in FIG. 2) that are present within the geographic area served by a LOI 106 will receive mobile broadcasts from one or more of the transmitters 110 in the LOI 106. In some aspects, for example, individual transmitters 110 within a LOI combine in a single frequency network manner. Neighboring or adjacent LOIs have different scrambling of the waveform and therefore prevent a wireless device from receiving broadcast signals from more than one LOI at any one point in time. Thus, each LOI includes a Local Operations Center (LOC) 108 and a plurality of transmitters 110 operable for delivering the wide area services, the local area services and, in accordance with present aspects, the hybrid services to wireless devices located in the geographic area of the LOI 106.

Figure 3:
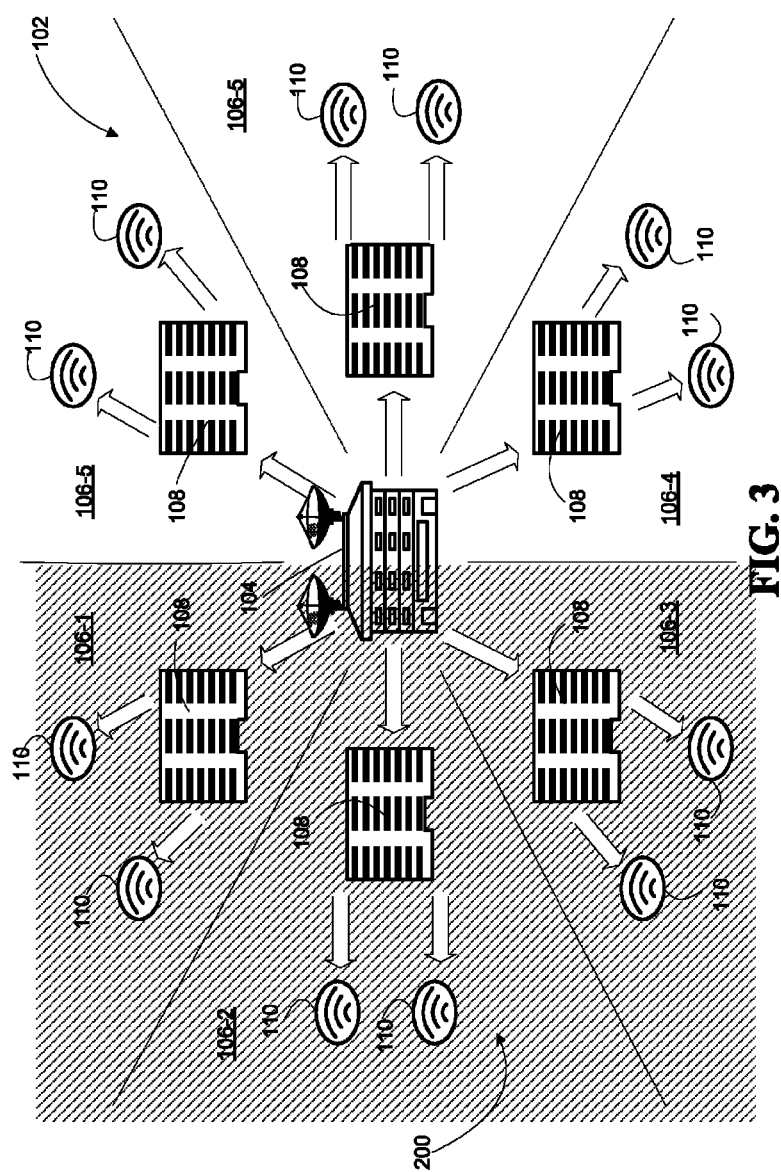
FIG. 3 is a schematic diagram of a mobile broadcast network in which a plurality of LOIs have been regionalized to provide for broadcast of a hybrid service, in accordance with present aspects.

Referring to FIG. 3, a mobile broadcast network and, specifically, a WOI 102 has a plurality of LOIs 106 regionalized to provide for delivery of a hybrid service across the region, according to an aspect. In FIG. 3, LOIs 106-1, 106-2 and 106-3 have been assembled to form region 200. The region 200 may be defined by organizing the scrambling of adjacent LOIs such that the individual transmitters 110 within LOIs 106-1, 106-2 and 106-3 combine in a Single Frequency Network (SFN) manner. By combining in an SFN manner, the LOIs in region 200 act as if they are a single LOI that occupies the geographic area of region 200. In accordance with present aspects, forming regions may be beneficial in order to deliver hybrid services across multiple contiguous LOIs that have a need for the hybrid service. For example, if the hybrid service is an alternate language service, such as a Spanish language service, the LOIs that occupy the geographic area in which the alternate language is predominately used may be grouped together to form a region and the hybrid service (e.g., the alternate language service) is then broadcasted across the entire region. Additionally, by providing the hybrid service to only designated LOIs that comprise a region, other LOIs, such as LOI 106-4, 106-5 and 106-5, which do not require the hybrid service (because of little interest by the populous of the geographic area occupied by the respective LOIs), do not have to allocate a channel within their network to the hybrid service. By not having to allocate a channel for the hybrid service, LOIs 106-4, 106-5 and 106-6 have additional resources available for allocation. As such, LOIs 106-4, 106-5 and 106-6 may deliver another service, such as an audio, video, multimedia and/or interactive service across the additional resources, thereby increasing network service capacity in LOIs 106-4, 106-5 and 106-6.

Figure 4:
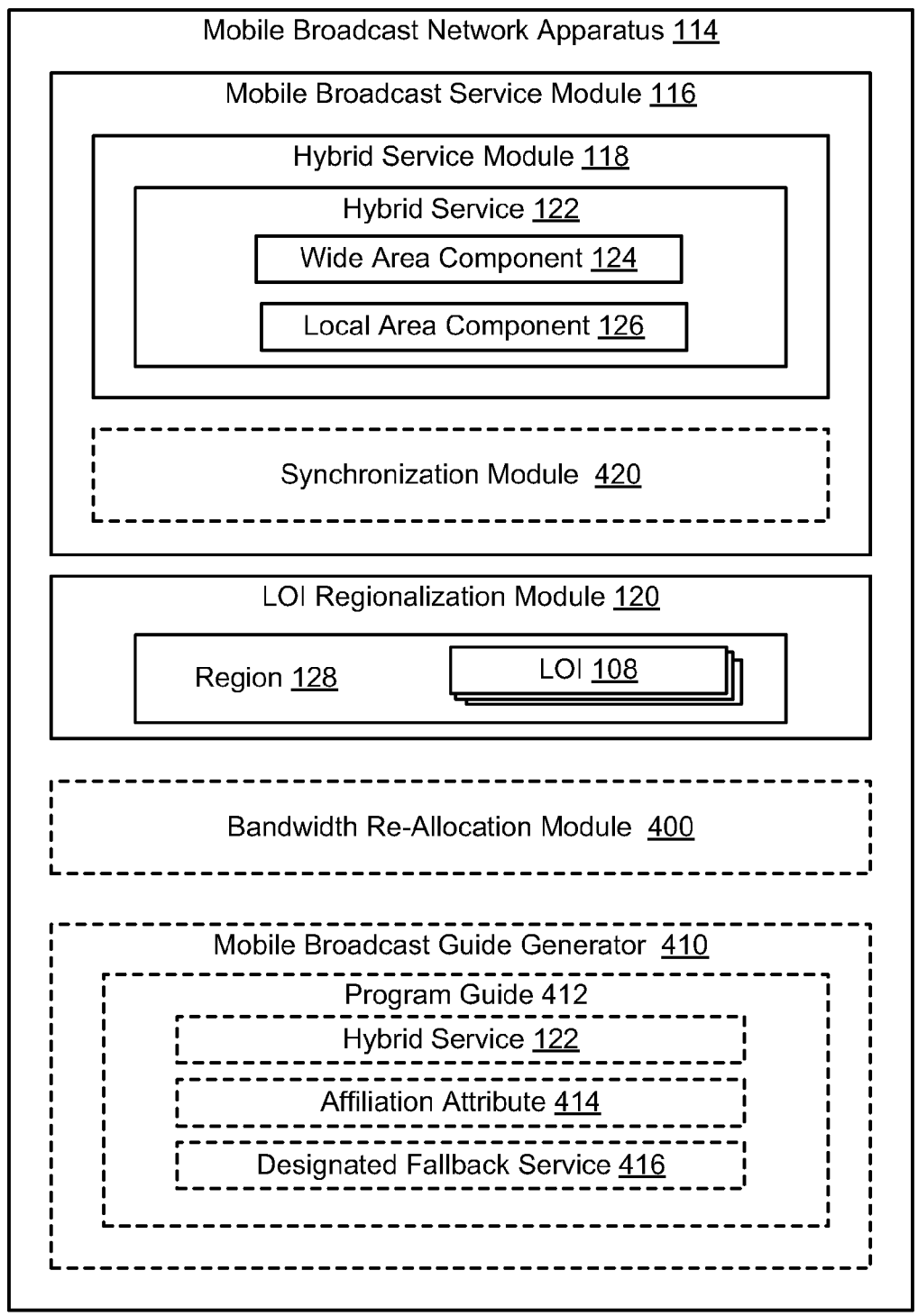
FIG. 4 is a detailed block diagram of a mobile broadcast network apparatus, according to aspects herein described.

FIG. 4 provides a block diagram representation of a mobile broadcast network apparatus 114, according to aspects herein disclosed. The apparatus 114 may comprise one or more devices within the network and may be located at the NOC, at the LOC or at a combination of both the NOC and the LOC. The apparatus 114 may include a mobile broadcast service module 116 operable for providing mobile services broadcasted across designated mobile broadcast channels. According to present aspects, the mobile broadcast service module 116 may include a hybrid service module 118 operable for providing hybrid services 122. As previously noted, the hybrid service 122 includes at least one wide area component 124 and at least one local area component 126. As such, present aspects allow for service classifications to come from both the wide area data and the local area data. For example, a hybrid service may comprise a first component from a wide area source and a second component from a local area source.

In one use case example, the wide area component may be a video component and the local area component may be an audio component. The local area audio component may provide for an alternate language service to be provided, such as a wide area or national video component combined with an alternate language audio component. In another use case example, the local audio component may be a local description of a real time service, such as local commentary of a news event or sporting event. Thus, a national video component of a news or sporting event may be combined with local audio commentary of the event to provide commentary geared for the broadcast recipients in the local market. In another use case example, the wide area components may be video and audio and the local area component may be a data component, such as streaming text, e.g. a crawl line or ticker, which can be inserted to overlay the video component. In this regard, the data component can provide local information along with the national or wide area video and audio components.

The mobile broadcast network apparatus 114 may additionally include a LOI regionalization module 120 operable for grouping a plurality of LOIs 108 into a region 128 for the purpose of broadcasting a hybrid service across an entire region 128. As previously discussed, a region may be formed by organizing the scrambling of the multiple adjacent LOIs in the region to act in a Single Frequency Network (SFN) manner.

The mobile broadcast network apparatus 114 may further include a bandwidth reallocation module 400 operable to recognize LOIs in which the hybrid service is not broadcasted and to allocate a network service to the channel for which the hybrid service would have been delivered across if the LOI was receiving the hybrid service. In this regard, network service capacity is increased, as the LOIs not receiving the hybrid service can designate the bandwidth not used for the hybrid service for some other network service.

Additionally, the mobile broadcast network apparatus 114 may include a mobile broadcast network guide generator 410 operable for generating the program guide 412 that is subsequently transmitted to the wireless devices. The program guide serves to provide the wireless device user with programming information, such as service/program identification, the channel on which a service is shown, the times for presenting the service/program and the like. In one aspect, the mobile broadcast network guide generator 410 may be configured to indicate hybrid service 122 in the guide 412 as a local service. In this regard, the local guide 412 associated with a LOI may list the hybrid broadcast service according to a wide area component and one or more local area component, such as a video wide area component associated with one or more audio local area components, such as alternative languages. Additionally, the mobile broadcast network guide generator 410 may be configured to indicate a fallback service that may be automatically presented to the wireless device in the event that the hybrid service or any one component of the hybrid service is interrupted or otherwise becomes unavailable. The fallback service may be identified via an affiliation attribute 414 associated with the hybrid service. The affiliation attribute 414 is not channel or service specific, but rather the affiliation associated with the hybrid service, generally the wide area affiliation, may dictate the fallback service that is provided in the event of hybrid service interruption. Affiliation type fallback service provides for the fallback service to be dynamic and, thus, determined at the time of the interruption. Alternatively, the fallback service may be an explicit identification of a designated fallback service 416 associated with the hybrid service, such that interrupted hybrid service automatically is replaced with the designated fallback service.

The mobile broadcast service module 116 may additionally include a synchronization module 420 that is operable to synchronize the various components of the hybrid service. In one aspect, the synchronization module may be operable to re-label all captured source that comprises the hybrid service in mobile broadcast network system time, such as FLO time or the like.

Figure 5:
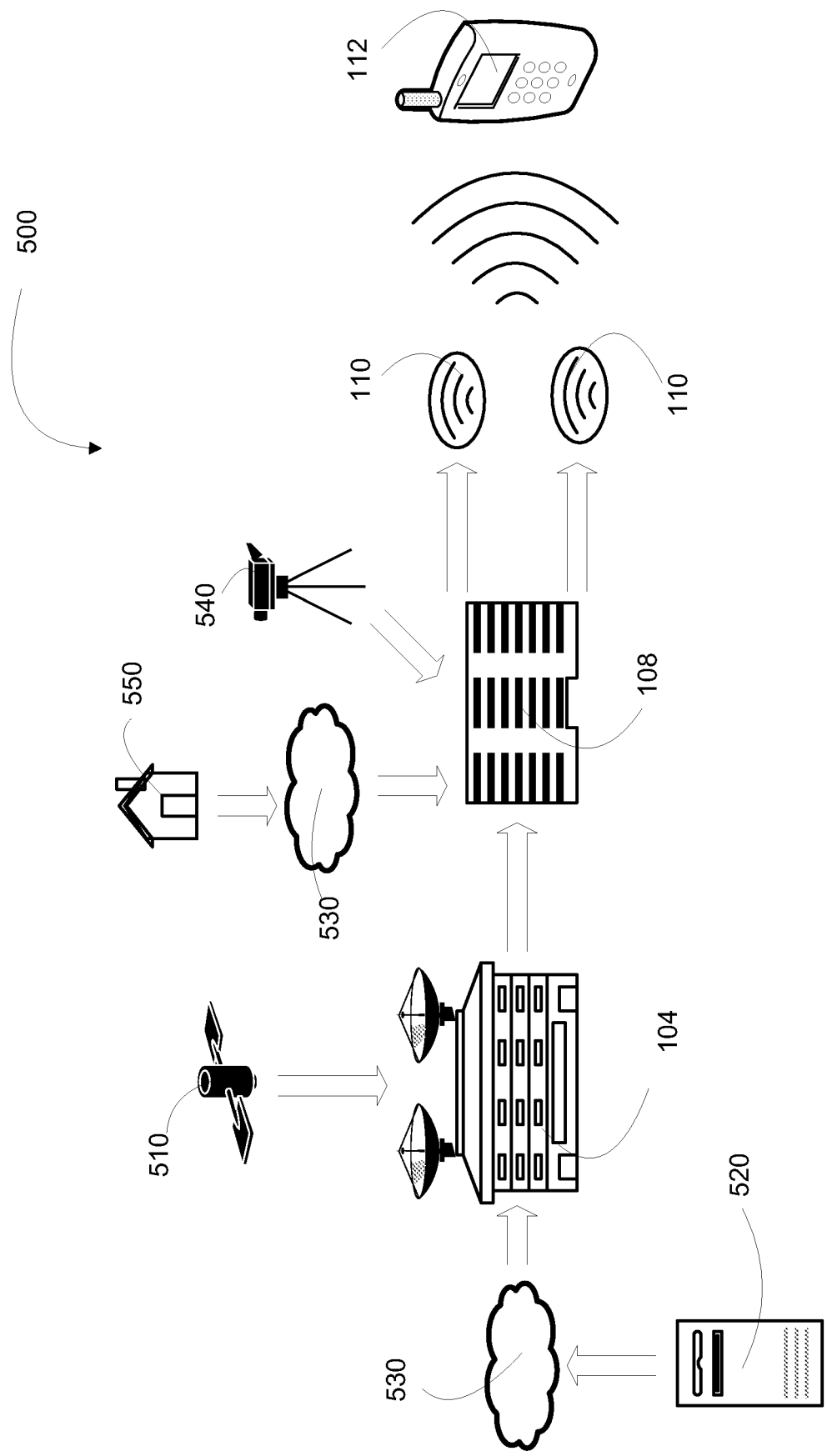
FIG. 5 is a schematic diagram of a mobile broadcast network highlighting sources for media content, according to aspects.

FIG. 5 provides a schematic diagram of a mobile broadcast network 500 illustrating the various sources for content; according to aspects herein described. The National Operations Center (NOC) 104 may acquire content via satellites 510, through national or wide area content providers 520, which may deliver content through the Internet 530 or other acceptable delivery mechanisms, or the NOC may acquire content in any other suitable manner (not shown in FIG. 5). Once content has been acquired by NOC 104, the content is delivered to the Local Operations Centers (LOCs) 108 through National or wide area multiplex distribution mechanisms.

The LOCs 108 may acquire content directly from local content providers 540, or through other local providers 550, which may deliver content through the Internet 530 or other acceptable network delivery mechanisms, or the LOC 108 may acquire content in any other suitable manner (not shown in FIG. 5). At the LOC, the national, local and hybrid services are distributed to base stations (not shown in FIG. 5), which include transmitters 110 operable to provide mobile broadcast transmissions that are received by wireless devices 112.

The media to support a hybrid service (not shown in FIG. 5) may be captured at either the wide area NOC, the local area LOC or a combination of both. The local components of the hybrid service may be inserted at the LOI level or the local components may be distributed from another point in the broadcast system and subsequently routed into the local multiplex.

Figure 6:
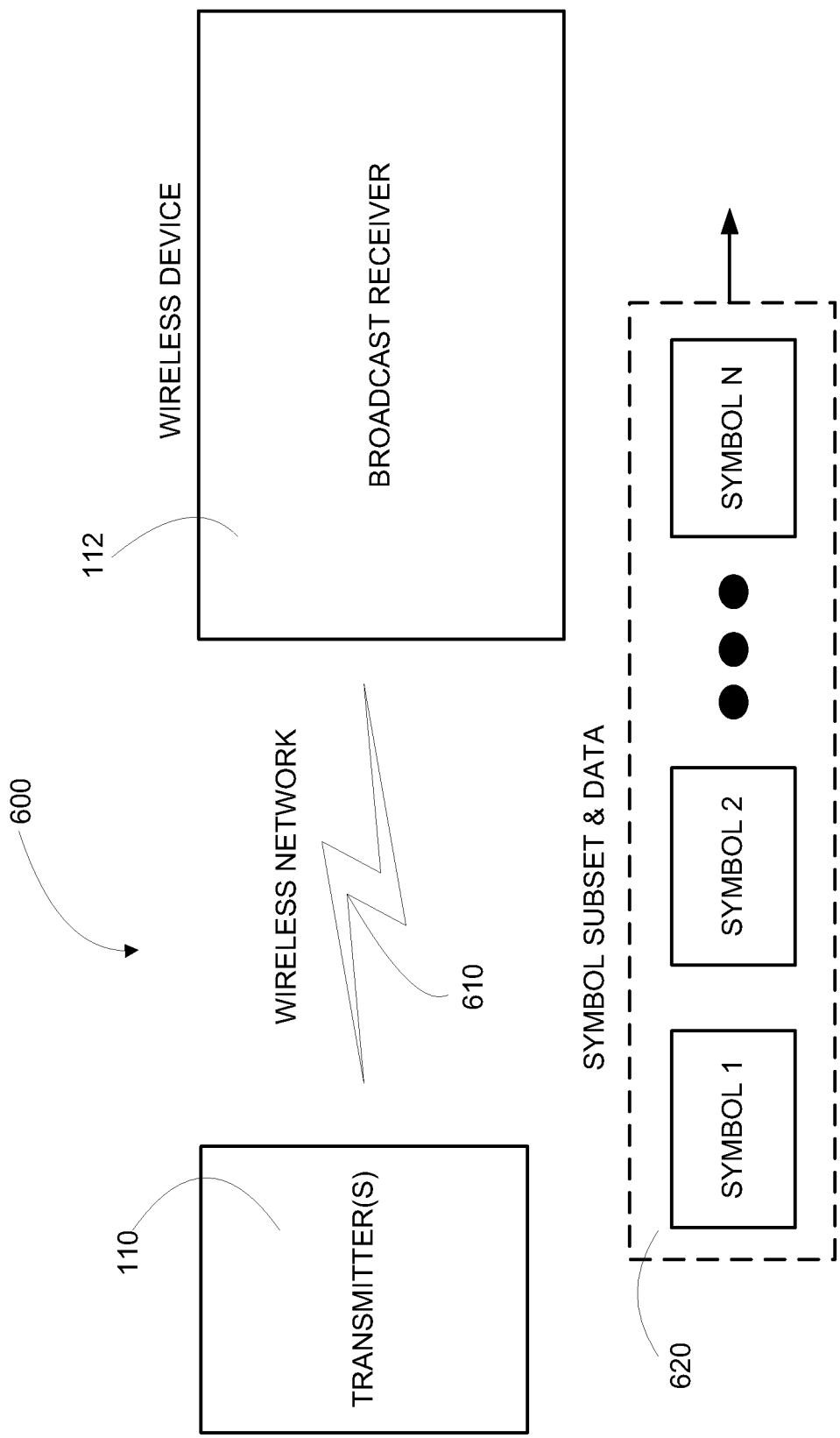
FIG. 6 is a schematic block diagram of a mobile broadcast network illustrating symbol subsets and data; according to another aspect.

FIG. 6 illustrates a wireless network system 600 for one type of mobile broadcast network, specifically a MediaFLO™ broadcast network, according to aspects herein described. The system 600 includes one or more transmitters 110 that are located within LOIs (not shown in FIG. 5) and are operable to transmit broadcast services across a wireless network 610 to one or more wireless devices 112. The wireless devices 112 can include substantially any type of communicating device such as a cell phone, personal assistant, hand held or laptop devices, and so forth. Portions of the wireless device 112 are employed to decode a symbol subset 620 and other data such as multimedia data. The symbol subset 620 is generally transmitted in an Orthogonal Frequency Division Multiplexing (OFDM) network that employs forward link only (FLO) protocols for multimedia data transfer. Channel estimation is generally based on uniformly spaced pilot tones inserted in the frequency domain, and in respective OFDM symbols. The pilots are spaced 8 carriers apart, and the number of pilot carriers is set at 512.

Figure 7:
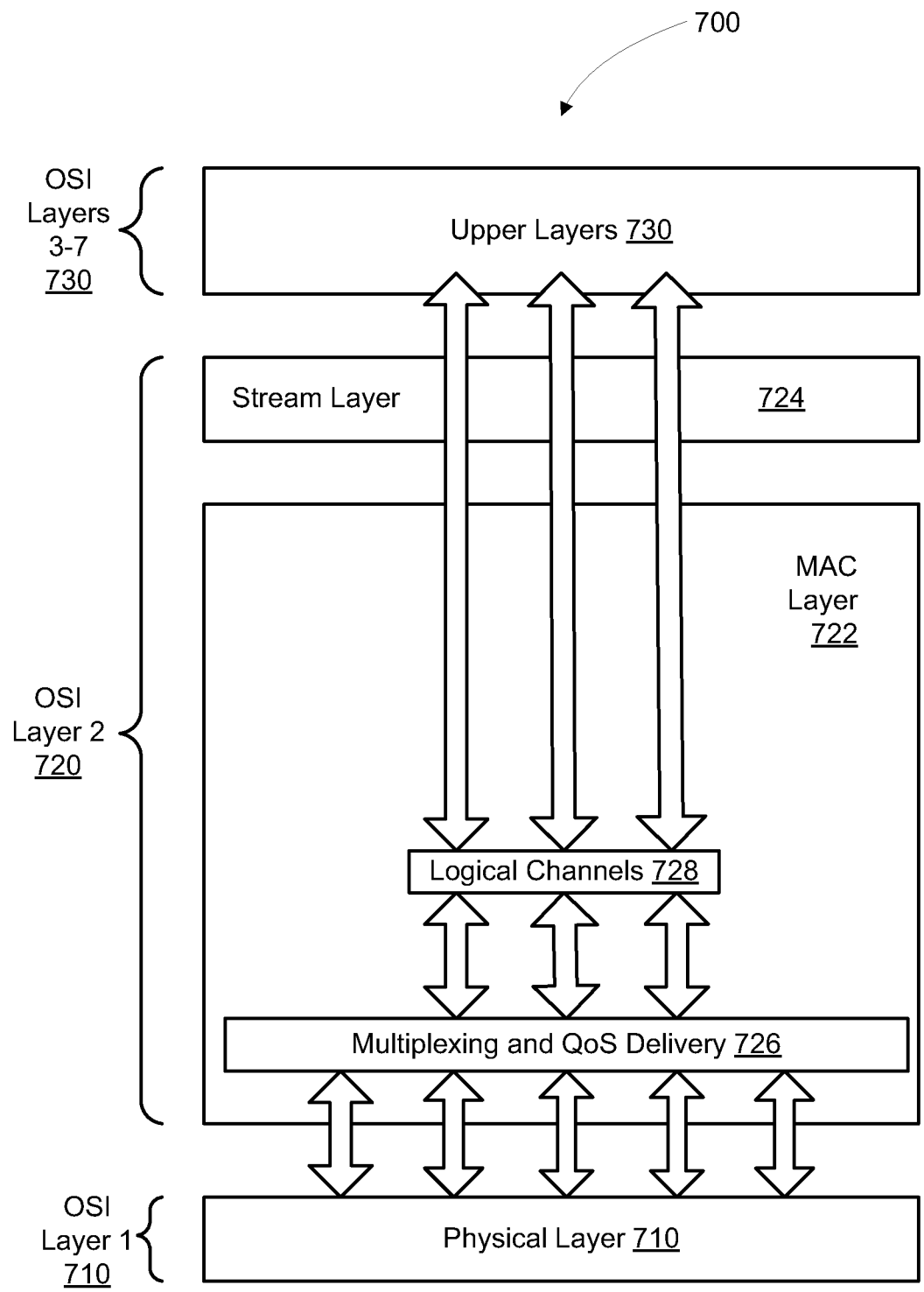
FIG. 7 is a block diagram illustrating example network layers for a mobile broadcast network system; according to an aspect.

FIG. 7 illustrates an example of network layers 700 for a wireless system where data received there from may be employed in the frequency blocks described above. A Forward Link-Only (FLO) air interface protocol reference model is shown in FIG. 7. Generally, the FLO air interface specification covers protocols and services corresponding to Open Systems Interconnect (OSI) networking model having Layers 1 (Physical Layer) 710 and Layer 2 (Data Link layer) 720. The Data Link layer is further subdivided into two sub-layers, namely, Medium Access (MAC) sub-layer 722, and Stream sub-layer 724. Upper Layers 730 include OSI layers 3-7 and can include compression of multimedia content, access control to multimedia, along with content and formatting of control information. The MAC layer 722 includes multiplexing and Quality of Service (QoS) delivery functions 726. The MAC layer 722 also includes logical channels 728.

The FLO air interface specification typically does not specify the upper layers 730, which allows for design flexibility in support of various applications and services. As such, these layers are shown to provide context. The Stream Layer 724 includes multiplexes up to three upper layer flows into one logical channel 728, binding of upper layer packets to streams for each logical channel 728, and provides packetization and residual error handling functions. Features of the Medium Access Control (MAC) Layer 722 include controlling access to the physical layer 710, performing the mapping between logical channels and physical channels, multiplexing logical channels for transmission over the physical channel, de-multiplexing logical channels at the mobile device, and/or enforcing Quality of Service (QOS) requirements. Features of Physical Layer 710 include providing channel structure for the forward link, and defining frequency, modulation and encoding requirements.

In general, FLO technology utilizes Orthogonal Frequency Division Multiplexing (OFDM), which is also utilized by Digital Audio Broadcasting (DAB), Terrestrial Digital Video Broadcasting (DVB-T), and Terrestrial Integrated Services Digital Broadcasting (ISDB-T). Generally, OFDM technology can achieve high spectral efficiency while effectively meeting mobility requirements in a large cell Single Frequency Network (SFN). Also, OFDM can handle long delays from multiple transmitters with a suitable length of cyclic prefix; a guard interval added to the front of the symbol (which is a copy of the last portion of the data symbol) to facilitate orthogonality and mitigate inter-carrier interference. As long as the length of this interval is greater than the maximum channel delay, reflections of previous symbols are removed and the orthogonality is preserved. It should be understood, however, that the described aspects are not limited to FLO technology and OFDM protocols, but may include any broadcasting technology.

Figure 8:
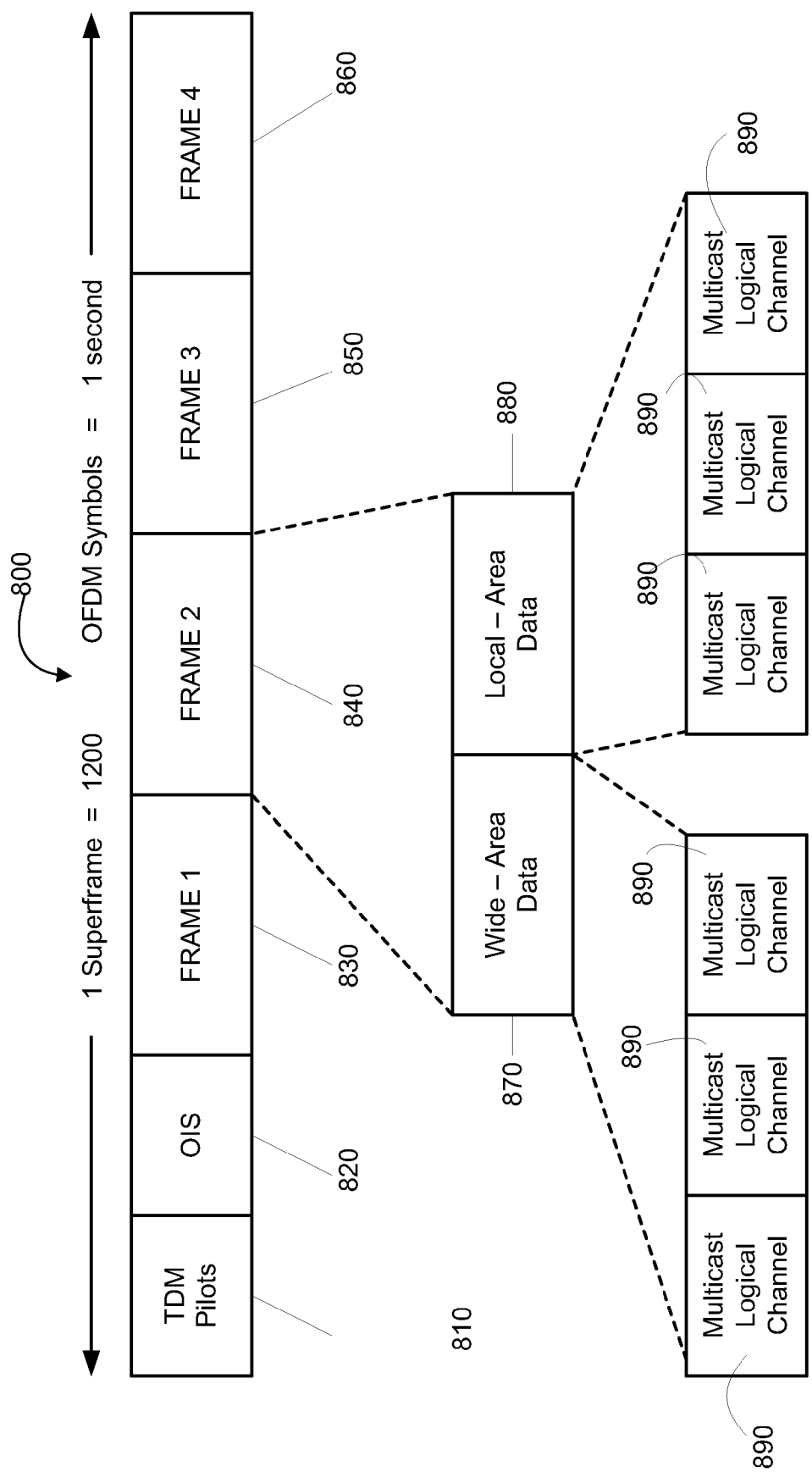
FIG. 8 is a block diagram illustrating an example data structure and signal for a mobile broadcast network, according to a described aspect.

Proceeding to FIG. 8, a FLO physical layer superframe 800 is illustrated, according to aspects herein described. In an embodiment, a superframe is equal to 1200 OFDM symbols with a one second time duration. The FLO physical layer uses a 4K mode (yielding a transform size of 4096 sub-carriers), providing superior mobile performance compared to an 8K mode, while retaining a sufficiently long guard interval that is useful in fairly large SFN cells. Rapid channel acquisition can be achieved through an optimized pilot and interleaver structure design. The interleaving schemes incorporated in the FLO air interface facilitate time diversity. The pilot structure and interleaver designs optimize channel utilization without requiring long acquisition times. Generally, FLO transmitted signals are organized into super frames as illustrated in FIG. 8. Each super frame is comprised of four frames of data, including TDM pilots (Time Division Multiplexed) 810, Overhead Information Symbols (OIS) 820 and frames 830, 840, 850, 860. The TDM pilots 810 are provided to allow for rapid acquisition of the OIS 820. The OIS 820 describes the location of the data for each media service in the super frame.

Each frame 830, 840, 850 and 870 includes wide-area 870 and local-area data 880. Within the wide area data 870 and the local area data 880 there are physical data channels, which are referred to in FIG. 8, by way of example, as Multicast Logical Channels (MLCs) 890. Each MLC 890 includes the components of a service. For example, each MLC may include three data streams, such as a video data stream, an audio data stream and a conditional access stream that provides access to the video and audio streams. In other aspects, in addition to or in lieu of physical channels, such as MLCs, the service may be formed from a streaming source, such as provided by a URL(s), a combination of physical channels, streaming sources or the like. In conventional mobile broadcast networks, such as a FLO network, system information only allows for a mobile broadcast service to comprise the components within a single local area data source or a single wide area data source. However, according to aspects herein described, service classification is redefined to allow for a mobile broadcast service to include components from both a wide area data source and a local area data source. In this regard, the system information, according to present aspects, allows for a service to comprise components of one or more wide area data source and components of one or more local area data source.

Typically, each super frame 800 consists of 200 OFDM symbols per MHz of allocated bandwidth (1200 symbols for 6 MHz), and each symbol contains 7 interlaces of active sub-carriers. Each interlace is uniformly distributed in frequency, so that it achieves the full frequency diversity within the available bandwidth. These interlaces are assigned to logical channels that vary in terms of duration and number of actual interlaces used. This provides flexibility in the time diversity achieved by any given data source. Lower data rate channels can be assigned fewer interlaces to improve time diversity, while higher data rate channels utilize more interlaces to minimize the radio's on-time and reduce power consumption.

The acquisition time for both low and high data rate channels is generally the same. Thus, frequency and time diversity can be maintained without compromising acquisition time. Most often, FLO logical channels are used to carry real-time (live streaming) content at variable rates to obtain statistical multiplexing gains possible with variable rate codecs (Compressor and Decompressor in one). Each logical channel can have different coding rates and modulation to support various reliability and quality of service requirements for different applications. The FLO multiplexing scheme enables device receivers to demodulate the content of the single logical channel it is interested in to minimize power consumption. Mobile devices can demodulate multiple logical channels concurrently to enable video and associated audio to be sent on different channels.

Error correction and coding techniques can also be employed. Generally, FLO incorporates a turbo inner code 13 and a Reed Solomon (RS) 14 outer code. Typically, the turbo code packet contains a Cyclic Redundancy Check (CRC). The RS code need not be calculated for data that is correctly received, which, under favorable signal conditions, results in additional power savings. Another aspect is that the FLO air interface is designed to support frequency bandwidths of 5, 6, 7, and 8 MHz. A highly desirable service offering can be achieved with a single Radio Frequency channel.

Figure 9:
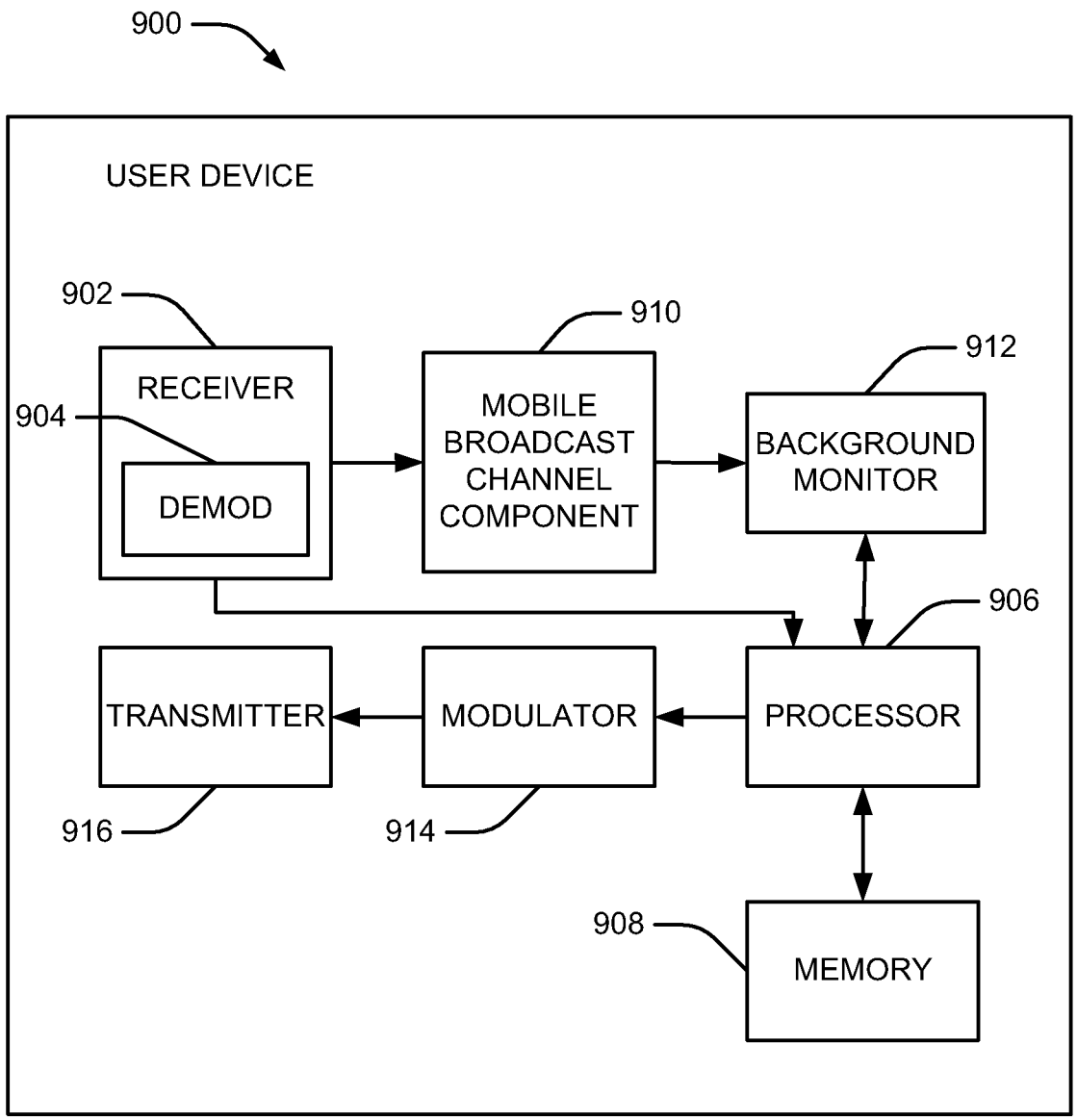
FIG. 9 is block diagram depicting the architecture of a wireless device configured for receiving mobile broadcast services, according to aspects herein described.

FIG. 9 is an illustration of a user device 900 (e.g., wireless device) that is employed in a wireless communication environment, in accordance with one or more aspects set forth herein. User 900 comprises a receiver 902 that receives a signal from, for instance, a receive antenna (not shown), and performs typical actions thereon (e.g., filters, amplifies, down converts, etc.) the received signal and digitizes the conditioned signal to obtain samples. Receiver 902 can be a non-linear receiver. A demodulator 904 can demodulate and provide received pilot symbols to a processor 906 for channel estimation. A mobile broadcast channel component 910, such as a FLO channel component is provided to process mobile broadcast signals as previously described. This can include digital stream processing and/or positioning location calculations among other processes. Processor 906 can be a processor dedicated to analyzing information received by receiver 902 and/or generating information for transmission by a transmitter 916, a processor that controls one or more components of user device 900, and/or a processor that both analyzes information received by receiver 902, generates information for transmission by transmitter 916, and controls one or more components of user device 900.

User device 900 can additionally comprise memory 908 that is operatively coupled to processor 906 and that stores information related to wireless network data processing. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject apparatus and methods is intended to comprise, without being limited to, these and any other suitable types of memory. User device 900 further comprises a background monitor 912 for processing mobile broadcast data, such as FLO data, a symbol modulator 914 and a transmitter 916 that transmits the modulated signal.

Figure 10:
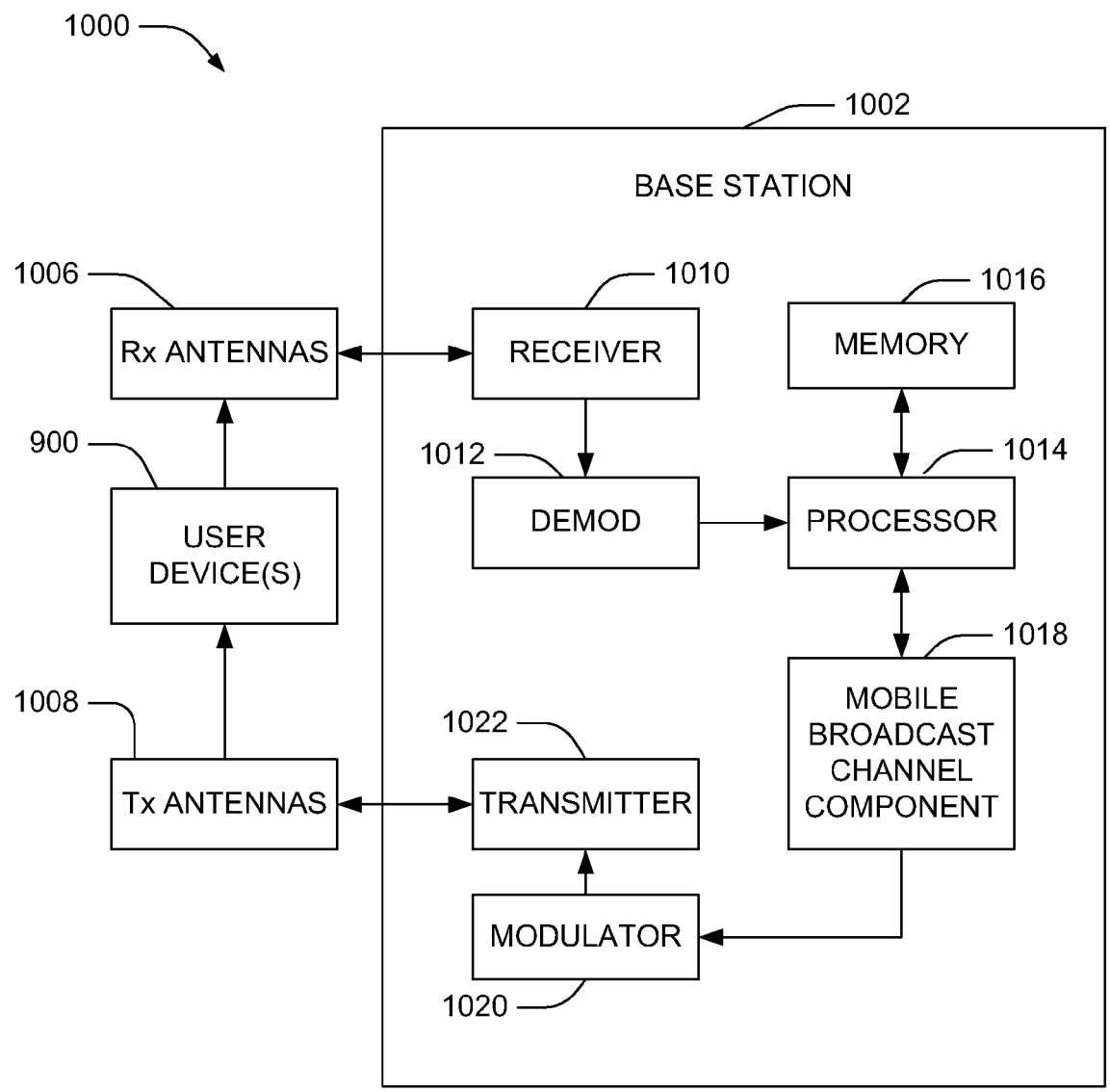
FIG. 10 is a block diagram depicting the architecture of a base station configured to transmit mobile broadcast services; according to another aspect herein described.

FIG. 10 is an illustrates an example system 1000 that comprises a base station 1002 with a receiver 1010 that receives signal(s) from one or more user devices 900 through a plurality of receive antennas 1006, and a transmitter 1024 that transmits to the one or more user devices 900 through a transmit antenna 1008. Receiver 1010 can receive information from receive antennas 1006 and is operatively associated with a demodulator 1012 that demodulates received information. Demodulated symbols are analyzed by a processor 1014 that is similar to the processor described above, and which is coupled to a memory 1016 that stores information related to wireless data processing. Processor 1014 is further coupled to a mobile broadcast channel component 1018, such as a FLO channel component that facilitates processing mobile broadcast information associated with one or more respective user devices 900.

A modulator 1022 can multiplex a signal for transmission by a transmitter 1024 through transmit antenna 1008 to user devices 900. Mobile broadcast channel component 1018 can append information to a signal related to an updated data stream for a given transmission stream for communication with a user device 1004, which can be transmitted to user device 900 to provide an indication that a new optimum channel has been identified and acknowledged.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Thus, methods, apparatus and computer program products are defined for a hybrid mobile broadcast service. By forming hybrid services from both wide area components and local area components, hybrid services are able to be regionalized so as to meet the needs of the users in given locale or region. For example, a wide area video component may be combined with a local area alternate language to provide an alternate language service to a specified geographic region within the mobile broadcast network. Since the hybrid service does not have to be broadcasted to the entire wide area network, a capacity savings results, in that, bandwidth that would otherwise be used to broadcast the hybrid service system-wide can be re-allocated to another service. In addition multiple local area infrastructures can be combined to form a regionalized infrastructure for the purpose of delivering the hybrid service across a designated region.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored as one or more instructions or codes on a non-transitory computer-readable medium. Non-transitory computer-readable media includes any computer storage media that facilitates transfer of a computer program from one place to another. A storage medium may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of non-transitory computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for providing regionalized delivery of hybrid mobile broadcast services in a mobile broadcast network, comprising:
   providing for a hybrid mobile broadcast service that comprises a wide area component and a first local area component in a transmission frame;
   broadcasting the hybrid mobile broadcast service across a plurality of local area transmitter groups; and
   providing for a local guide for each of the plurality of local area transmitter groups that identifies and lists the hybrid mobile broadcast service according to the wide area component and the first local area component and the wide area component and a second local area component.

2. The method of claim 1, wherein providing for the hybrid mobile broadcast service further comprises providing for the hybrid mobile broadcast service that includes a plurality of data streams compiled from more than one independent data source.

3. The method of claim 2, wherein the more than one independent data source comprises physical channels, streaming sources or a combination of physical channels and streaming sources.

4. The method of claim 1, further comprising synchronizing the hybrid mobile broadcast service for the broadcast across the plurality of local area transmitter groups by re-labeling captured source in mobile broadcast network system time.

5. The method of claim 4, wherein synchronizing the hybrid mobile broadcast service further comprises providing synchronous time labeling to the first local area component prior to broadcasting the hybrid mobile broadcast service.

6. A method for providing regionalized delivery of hybrid mobile broadcast services in a mobile broadcast network, comprising:
   providing for a hybrid mobile broadcast service that comprises a wide area component and at least one local area component in a transmission frame;
   synchronizing the hybrid mobile broadcast service for the broadcast across the plurality of local area transmitter groups by re-labeling captured source in mobile broadcast network system time and providing synchronous time labeling to at least one of a 3G or 4G delivered local area component prior to broadcasting the hybrid mobile broadcast service such that the local area component is synchronous to the wide area component;

broadcasting the hybrid mobile broadcast service across a plurality of local area transmitter groups; and reallocating bandwidth in other local area transmitter groups outside of a region of the plurality of local area transmitter groups based on bandwidth being conserved and reassigned as a result of providing a hybrid mobile broadcast service broadcasted across the plurality of local area transmitter groups.

7. The method of claim 1, wherein the first local area component comprises at least one of a local area audio component and a local area data component.

8. The method of claim 7, wherein providing for the hybrid mobile broadcast service further comprises providing for the hybrid mobile broadcast service that includes a wide area video component and a local area data component that comprises a streaming text component.

9. The method of claim 1, wherein broadcasting the hybrid mobile broadcast service further comprises configuring scrambling for the plurality of local area transmitter groups to provide for the plurality of local area transmitter groups to function as a regional Single Frequency Network (SFN).

10. The method of claim 1, further comprising providing a fallback service for instances in which the hybrid mobile broadcast service is interrupted, wherein the fallback service comprises one of a service affiliation in a mobile broadcast network guide or a fallback service in a mobile broadcast network guide.

11. A method for providing regionalized delivery of hybrid mobile broadcast services in a mobile broadcast network, comprising:

providing for a hybrid mobile broadcast service that comprises a wide area component and at least one local area component in a transmission frame;

broadcasting the hybrid mobile broadcast service across a plurality of local area transmitter groups;

providing for a local guide for each of the plurality of local area transmitter groups that lists the hybrid mobile broadcast service according to the wide area component and the first local area component and the wide area component and a second local area component;

reallocating bandwidth in other local area transmitter groups outside of a region of the plurality of local area transmitter groups based on bandwidth being conserved and reassigned as a result of providing a hybrid mobile broadcast service broadcasted across the plurality of local area transmitter groups.

12. A method for providing regionalized delivery of hybrid mobile broadcast services in a mobile broadcast network, comprising:

providing for a hybrid mobile broadcast service that comprises a wide area component and at least one local area component in a transmission frame;

broadcasting the hybrid mobile broadcast service across a plurality of local area transmitter groups;

providing for a local guide for each of the plurality of local area transmitter groups that lists the hybrid mobile broadcast service according to the wide area component and the at least one local area component by providing a filtering mechanism that provides for one or more regional services to be placed in the local guide of all local area transmitter groups in a region; and reallocating bandwidth in other local area transmitter groups outside of a region of the plurality of local area transmitter groups based on bandwidth being conserved and reassigned as a result of providing a hybrid mobile broadcast service broadcasted across the plurality of local area transmitter groups.

13. A non-transitory computer-readable medium having stored therein processor-executable software instructions configured to cause a processor within a network apparatus to perform operations comprising:

providing for a hybrid mobile broadcast service that comprises a wide area component and a first local area component in a transmission frame;

broadcasting the hybrid mobile broadcast service across a plurality of local area transmitter groups; and providing for a local guide for each of the plurality of local area transmitter groups that identifies and lists the hybrid mobile broadcast service according to the wide area component and the first local area component and the wide area component and a second local area component.

14. An apparatus, comprising:

means for providing a hybrid mobile broadcast service that includes a wide area component and a first local area component in a transmission frame;

means for broadcasting the hybrid mobile broadcast service across a plurality of local area transmitter groups; and means for providing for a local guide for each of the plurality of local area transmitter groups that identifies and lists the hybrid mobile broadcast service according to the wide area component and the first local area component and the wide area component and a second local area component.

15. A network apparatus, comprising:

a memory; and a processor coupled to the memory and configured with processor-executable instructions to perform operations comprising:

providing a hybrid mobile broadcast service that includes a wide area component and a first local area component in a transmission frame;

configuring a plurality of local area transmitter groups into a regionalized infrastructure operable to broadcast the hybrid mobile broadcast service; and providing for a local guide for each of the plurality of local area transmitter groups that identifies and lists the hybrid mobile broadcast service according to the wide area component and the first local area component and the wide area component and a second local area component.

16. The network apparatus of claim 15, wherein the processor is configured with processor-executable instructions such that providing the hybrid mobile broadcast service further comprises providing the hybrid mobile broadcast service that includes a plurality of data streams compiled from more than one independent data source.

17. The network apparatus of claim 16, wherein the processor is configured with processor-executable instructions such that the plurality of data streams are compiled from more than one physical channel, streaming source or a combination of physical channels and streaming sources.

18. The network apparatus of claim 15, wherein the processor is configured with processor-executable instructions to perform operations further comprising synchronizing the hybrid mobile broadcast service for the broadcast across the plurality of local area transmitter groups by re-labeling captured source in mobile broadcast network system time.

19. The network apparatus of claim 18, wherein the processor is configured with processor-executable instructions such that synchronizing the hybrid mobile broadcast service further comprises providing synchronous time labeling to the local area component prior to broadcasting the hybrid mobile broadcast service.

20. A network apparatus, comprising:
a memory; and
a processor coupled to the memory and configured with processor-executable instructions to perform operations comprising:
  providing a hybrid mobile broadcast service that includes a wide area component and at least one local area component in a transmission frame;
  synchronizing the hybrid mobile broadcast service for the broadcast across the plurality of local area transmitter groups by re-labeling captured source in mobile broadcast network system time and providing synchronous time labeling to at least one of a 3G or 4G local area component prior to broadcasting the hybrid mobile broadcast service such that the local area component is synchronous to the wide area component;
  configuring a plurality of local area transmitter groups into a regionalized infrastructure operable to broadcast the hybrid mobile broadcast service; and
  reallocating bandwidth in other local area transmitter groups outside of a region of the plurality of local area transmitter groups based on bandwidth being conserved and reassigned as a result of providing a hybrid mobile broadcast service broadcasted across the plurality of local area transmitter groups.

21. The network apparatus of claim 15, wherein the processor is configured with processor-executable instructions such that the first local area component comprises at least one of a local area audio component and a local area data component.

22. The network apparatus of claim 21, wherein the processor is configured with processor-executable instructions such that providing for the hybrid mobile broadcast service further comprises providing for the hybrid mobile broadcast service that comprises a wide area video component and a local area streaming text component.

23. The network apparatus of claim 15, wherein the processor is configured with processor-executable instructions such that broadcasting the hybrid mobile service further comprises configuring scrambling for the plurality of local area transmitter groups to provide for the plurality of local area transmitter groups to function as a regional Single Frequency Network (SFN).

24. A network apparatus, comprising:
a memory; and
a processor coupled to the memory and configured with processor-executable instructions to perform operations comprising:
  providing a hybrid mobile broadcast service that includes a wide area component and at least one local area component in a transmission frame;
  configuring a plurality of local area transmitter groups into a regionalized infrastructure operable to broadcast the hybrid mobile broadcast service;
  providing for a local guide for each of the plurality of local area transmitter groups that lists the hybrid mobile service according to a wide area component and a first local area component and the wide area component a second local area component; and
  reallocating bandwidth in other local area transmitter groups outside of a region of the plurality of local area transmitter groups based on bandwidth being conserved and reassigned as a result of providing a hybrid mobile broadcast service broadcasted across the plurality of local area transmitter groups.

25. A network apparatus, comprising:
a memory; and
a processor coupled to the memory and configured with processor-executable instructions to perform operations comprising:
  providing a hybrid mobile broadcast service that includes a wide area component and at least one local area component in a transmission frame;
  configuring a plurality of local area transmitter groups into a regionalized infrastructure operable to broadcast the hybrid mobile broadcast service;
  providing for a local guide for each of the plurality of local area transmitter groups that lists the hybrid mobile broadcast service according to the wide area component and the at least one local area component by providing a filtering mechanism that provides for one or more regional services to be placed in the local guide of all local area transmitter groups in a region; and
  reallocating bandwidth in other local area transmitter groups outside of a region of the plurality of local area transmitter groups based on bandwidth being conserved and reassigned as a result of providing a hybrid mobile broadcast service broadcasted across the plurality of local area transmitter groups.

26. The network apparatus of claim 15, wherein the processor is configured with processor-executable instructions to perform operations further comprising providing a service fallback for instances in which at least one component of the hybrid mobile broadcast service is interrupted.

27. The network apparatus of claim 26, wherein the processor is configured with processor-executable instructions such that providing the service fallback further comprises providing at least one of a fallback service or a service affiliation for the hybrid mobile broadcast service and further provide the fallback service or the service affiliation if the hybrid mobile broadcast service is interrupted.

28. A method for receiving a regionalized hybrid mobile broadcast service in a mobile broadcast network, comprising:
  receiving broadcast signals transmitted from at least one local area transmitter from a group of local area transmitters that is included in a plurality of local area transmitter groups forming a regionalized infrastructure;
  receiving a hybrid mobile broadcast service from the broadcast signals, wherein the hybrid mobile broadcast service is associated with the regionalized infrastructure and comprises a wide area component and a first local area component in a transmission frame
  receiving and storing a mobile broadcast network guide that identifies and lists the hybrid mobile broadcast services according to the wide area component and the first local area component and the wide area component and a second local area component; and
  presenting the first local area component in association with the wide area component.

29. The method of claim 28, wherein receiving the hybrid mobile broadcast service further comprises receiving the hybrid mobile broadcast service that includes a plurality of data streams compiled from more than one independent data source.

30. The method of claim 29, wherein the more than one independent data source comprises at least one of physical channels, streaming sources or a combination of physical channels and streaming sources.

31. The method of claim 28, wherein the first local area component comprises at least one local area audio component or local area data component.

32. The method of claim 31, wherein receiving the hybrid mobile broadcast service further comprises receiving that hybrid mobile broadcast service that comprises a wide area video component and a local area streaming text component.

33. The method of claim 28, wherein receiving broadcast signals transmitted from a group of local area transmitters further comprises receiving broadcast transmissions scrambling for the plurality of local area transmitter groups to provide for the plurality of local area transmitter groups to function as a regional Single Frequency Network (SFN).

34. A method for receiving a regionalized hybrid mobile broadcast service in a mobile broadcast network, comprising:
   receiving broadcast signals transmitted from at least one local area transmitter from a group of local area transmitters that is included in a plurality of local area transmitter groups forming a regionalized infrastructure;
   receiving a hybrid mobile broadcast service from the broadcast signals, wherein the hybrid mobile broadcast service is associated with the regionalized infrastructure and comprises at least one wide area component and at least one local area component in a transmission frame, wherein the at least one local area component comprises content that is associated with the at least one wide area component;
   receiving and storing a mobile broadcast network guide that lists hybrid mobile broadcast services according to a wide area component and a first local area component and the wide area component and a second local area component; and
   presenting the at least one local area component in association with the at least one wide area component.

35. The method of claim 28, wherein receiving a hybrid mobile broadcast service from the broadcast signals further comprises receiving the hybrid mobile broadcast service, wherein the hybrid mobile broadcast service has been synchronized for broadcast across the plurality of local area transmitter groups by relabeling captured source in mobile broadcast network system time.

36. The method of claim 35, wherein receiving a hybrid mobile broadcast service further comprises receiving the hybrid mobile broadcast service, wherein synchronous time labeling has been provided to the local area components prior to broadcasting the hybrid mobile broadcast service.

37. A method for receiving a regionalized hybrid mobile broadcast service in a mobile broadcast network, comprising:
   receiving broadcast signals transmitted from at least one local area transmitter from a group of local area transmitters that is included in a plurality of local area transmitter groups forming a regionalized infrastructure;
   receiving a hybrid mobile broadcast service from the broadcast signals, wherein:
      the hybrid mobile broadcast service is associated with the regionalized infrastructure and comprises at least one wide area component and at least one local area component in a transmission frame;
      the at least one local area component comprises content that is associated with the at least one wide area component, and
      synchronous time labeling has been provided to at least one of a 3G or 4G delivered local area component such that the local area component is synchronous to the wide area component; and
   presenting the at least one local area component in association with the at least one wide area component.

38. The method of claim 28, further comprising receiving a fallback service in replacement of the hybrid mobile broadcast service if the hybrid mobile broadcast service is interrupted.

39. The method of claim 38, wherein receiving a fallback service further comprises receiving one of a service affiliation from a mobile broadcast network guide or a designated fallback service from a mobile broadcast network guide.

40. A non-transitory computer-readable medium having stored therein processor-executable software instructions configured to cause a processor of a network apparatus to perform operations comprising:
   receiving broadcast signals transmitted from at least one local area transmitter from a group of local area transmitters that is included in a plurality of local area transmitter groups forming a regionalized infrastructure;
   receiving a hybrid mobile broadcast service from the broadcast signals, wherein the hybrid mobile broadcast service is associated with the regionalized infrastructure and comprises a wide area component and a first local area component in a transmission frame, wherein the first local area component comprises content that is associated with the wide area component;
   receiving and storing a mobile broadcast network guide that identifies and lists the hybrid mobile broadcast services according to the wide area component and the first local area component and the wide area component and a second local area component; and
   presenting the first local area component in association with the wide area component.

41. An apparatus, comprising:
   means for receiving broadcast signals transmitted from at least one local area transmitter from a group of local area transmitters that is included in a plurality of local area transmitter groups forming a regionalized infrastructure;
   means for receiving a hybrid mobile broadcast service from the broadcast signals, wherein the hybrid mobile broadcast service is associated with the regionalized infrastructure and comprises a wide area component and a first local area component in a transmission frame, wherein the first local area component comprises content that is associated with the wide area component;
   means for receiving and storing a mobile broadcast network guide that identifies and lists the hybrid mobile broadcast services according to the wide area component and the first local area component and the wide area component and a second local area component; and
   means for presenting the first local area component in association with the wide area component.

42. A wireless device apparatus, comprising:
   a memory; and
   a processor coupled to the memory and configured with processor-executable instructions to perform operations comprising:
      receiving broadcast signals transmitted from at least one local area transmitter from a group of local area transmitters that is included in a plurality of local area transmitter groups forming a regionalized infrastructure;
      receiving a hybrid mobile broadcast service from the broadcast signals, wherein the hybrid mobile broadcast service is associated with the regionalized infrastructure and comprises a wide area component and first local area component in a transmission frame, wherein the first local area component comprises content that is associated with the wide area component;

receiving and storing a mobile broadcast network guide that identifies and lists the hybrid mobile broadcast services according to the wide area component and the first local area component and the wide area component and a second local area component; and presenting the first local area component in association with the wide area component.

43. The wireless device apparatus of claim 42, wherein processor is configured with processor-executable instructions such that receiving the hybrid mobile broadcast service comprises receiving the hybrid mobile broadcast service that includes a plurality of data streams compiled from more than one independent data source.

44. The wireless device apparatus of claim 43, wherein the processor is configured with processor-executable instructions such that the more than one independent data source comprises at least one of physical channels, streaming sources or a combination of physical channels and streaming sources.

45. The wireless device apparatus of claim 42, wherein the first local area component comprises at least one local area audio component or local area data component.

46. The wireless device apparatus of claim 42, wherein the processor is configured with processor-executable instructions such that receiving broadcast signals transmitted from at least one local area transmitter comprises receiving broadcast transmissions scrambling for the plurality of local area transmitter groups to provide for the plurality of local area transmitter groups to function as a regional Single Frequency Network (SFN).

47. The wireless device apparatus of claim 42, wherein the processor is configured with processor-executable instructions to perform operations further comprising receiving and storing a mobile broadcast network guide that indicates the hybrid mobile broadcast service for the plurality of local area transmitter groups.

48. The wireless device apparatus of claim 42, wherein the processor is configured with processor-executable instructions such that receiving the hybrid mobile broadcast service from the broadcast signals comprises receiving the hybrid mobile broadcast service, wherein the hybrid mobile broadcast service has been synchronized for broadcast across the plurality of local area transmitter groups by relabeling captured source in mobile broadcast network system time.

49. The wireless device apparatus of claim 42, wherein the processor is configured with processor-executable instructions to perform operations further comprising receiving a fallback service in replacement of the hybrid mobile broadcast service if the hybrid mobile broadcast service is interrupted.

50. The wireless device apparatus of claim 49, wherein the processor is configured with processor-executable instructions such that receiving the fallback service comprises receiving one of a service affiliation from a mobile broadcast network guide or a designated fallback service from a mobile broadcast network guide.

51. A method for providing regionalized delivery of hybrid mobile broadcast services in a mobile broadcast network, comprising:

providing for a hybrid mobile broadcast service that comprises a wide area component combined with a first local area component in a transmission frame, wherein the first local area component comprises content that is associated with the wide area component;

providing for a local guide for each of the plurality of local area transmitter groups that identifies and lists the hybrid mobile broadcast service according to the wide area component and the first local area component and the wide area component and a second local area component; and broadcasting the hybrid mobile broadcast service across a plurality of local area transmitter groups.

\* \* \* \* \*